US008475885B2

(12) United States Patent
Uchiyama

(10) Patent No.: US 8,475,885 B2
(45) Date of Patent: Jul. 2, 2013

(54) METHOD OF FORMING ORGANIC FILM, AND ORGANIC FILM, NOZZLE PLATE, INKJET HEAD AND ELECTRONIC DEVICE

(75) Inventor: Hiroki Uchiyama, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 225 days.

(21) Appl. No.: 12/893,948

(22) Filed: Sep. 29, 2010

(65) Prior Publication Data

US 2011/0074882 A1 Mar. 31, 2011

(30) Foreign Application Priority Data

Sep. 30, 2009 (JP) ................................ 2009-227220

(51) Int. Cl.
*C08J 7/06* (2006.01)

(52) U.S. Cl.
USPC .......................................... 427/497; 427/97.4

(58) Field of Classification Search
USPC ................................ 427/497, 97.4, 107, 122
See application file for complete search history.

(56) References Cited

U.S. PATENT DOCUMENTS 6,752,487 B1 6/2004 Kubota et al.

FOREIGN PATENT DOCUMENTS

JP 2001-105597 4/2001
JP 2009-029068 12/2009

*Primary Examiner* — Lamson Nguyen
(74) *Attorney, Agent, or Firm* — Fish & Richardson P.C.

(57) ABSTRACT

The method of forming an organic film, includes: an organic film formation step of forming an organic film on a surface of a base member using a silane coupling agent; and a post-processing step including a water vapor introduction step of holding the base member on which the organic film has been formed in an atmosphere containing at least water vapor, and a dehydration processing step of holding the base member in an atmosphere having a smaller presence of water vapor than the atmosphere in the water vapor introduction step.

6 Claims, 9 Drawing Sheets

METHOD OF FORMING ORGANIC FILM, AND ORGANIC FILM, NOZZLE PLATE, INKJET HEAD AND ELECTRONIC DEVICE

BACKGROUND OF THE INVENTION

1. Field of the Invention

The present invention relates to a method of forming an organic film, and to an organic film, a nozzle plate, an inkjet head and an electronic device, and more particularly to technology for forming an organic film using a silane coupling agent.

2. Description of the Related Art

An organic film using a silane coupling agent can be formed on various base members, and therefore is applied in a wide range of fields. In the field of inkjet technology, a film of this kind is used when forming a liquid-repellent film on the ejection surface of a nozzle plate, or when bonding two base members together, or the like, and beneficial effects are achieved in improving the ejection characteristics, the maintenance properties and the durability of the head.

For example, Japanese Patent Application Publication No. 2001-105597 discloses an liquid ejection head used in an ink-jet recording apparatus, in which, in order to prevent damage of the ejection surface of a nozzle plate and degradation of a blade and maintain orifices in an excellent state preventing adherence of contamination to the ejection surface for a long time, the ejection surface is coated with a material having an ultrahigh water-repellent property, and heat treatment at 150° C. is performed after the coating process.

However, during the course of the reaction to form an organic film with a silane coupling agent, there have been situations where island-shaped projections are formed on the surface of the organic film. The island-shape projections are thought to be formed due to the layering, over the film, of the unreacted silane coupling agent or the polymerized silane coupling agent that is not bonded to the base member. It is difficult to remove these island-shaped projections in the processing (e.g., baking process) after formation of the film, and hence in order to suppress the projections, it has been necessary to control the film formation conditions very strictly at the film formation stage.

In particular, there has been a problem in that if island-shaped projections are formed in the vicinity of nozzles in the liquid-repellent film used on a nozzle plate of an inkjet head, then the ejection performance declines. Moreover, the island-shaped projections become detached during maintenance using a blade, or the like, and these detached projections can move inside the nozzles and block the nozzles, thus reducing the ejection accuracy.

Possible methods of removing the island-shaped projections are a method involving mechanical removal using a blade or the like, and a method involving immersion in a fluoric solvent. However, a mechanical removal method may cause damage to the nozzle surface and the liquid-repellent film itself, in addition to leading to the above-described movement of removed material inside the nozzles. Moreover, if removal is performed using a fluoric solvent, then although the projections can be removed easily if the process is carried out immediately after film formation, the film thickness is greatly reduced compared to the initial film thickness, and hence the durability of the film is markedly reduced. For example, when a silane coupling type liquid-repellent film was deposited on a silicon substrate and then immersed in a fluoric solvent (Asacrin AE-3000 manufactured by Asahi Glass) for 1 minute, then although the surface of the organic film was made smooth, the film thickness was reduced to about 10 nm or less from an initial thickness of 25 nm. Furthermore, when the alkali resistance of samples was checked in relation to the inclusion or omission of the fluoric solvent processing, a sample processed with the fluoric solvent had less than one half of the resistance of an unprocessed sample.

SUMMARY OF THE INVENTION

The present invention has been contrived in view of these circumstances, an object thereof being to provide a method of forming an organic film, and an organic film, a nozzle plate, an inkjet head, and an electronic device, in which the durability and smoothness of the organic film formed with a silane coupling agent can be improved by processing after film formation.

In order to attain the aforementioned object, the present invention is directed to a method of forming an organic film, comprising: an organic film formation step of forming an organic film on a surface of a base member using a silane coupling agent; and a post-processing step including a water vapor introduction step of holding the base member on which the organic film has been formed in an atmosphere containing at least water vapor, and a dehydration processing step of holding the base member in an atmosphere having a smaller presence of water vapor than the atmosphere in the water vapor introduction step.

According to this aspect of the present invention, it is thought that by holding the base member in the atmosphere containing water vapor after forming the organic film, it is possible to hydrolyze the reactive functional groups (for example, —OMe groups, or the like) of the silane coupling agent in the organic film which have not yet been hydrolyzed, and to convert these groups into —OH groups. Thereupon, by carrying out the dehydration processing step in the atmosphere where the presence of water vapor is less than the atmosphere of the water vapor introduction step, it is possible to create siloxane bonds due to dehydrating condensation reaction in the sites where —OH groups have bonded together through hydrogen bonds, and between —OH groups which have been formed by the water vapor introduction step, and therefore it is possible to form the organic film having a strong siloxane network. Furthermore, since it is possible to bond together the reactive functional groups which have been unbonded after the organic film forming step, then it is possible to make the organic film denser and make the surface of the organic film smoother.

Preferably, in the water vapor introduction step, the atmosphere has a relative humidity of not lower than 50%, more preferably not lower than 70%. Preferably, in the dehydration processing step, the atmosphere has a relative humidity of not higher than 20%, more preferably not higher than 10%, and even more preferably not higher than 5%. For example, the atmosphere in the water vapor introduction step has a relative humidity of not lower than 50%, and the atmosphere in the dehydration processing step has a relative humidity of not higher than 20%.

By adopting the aforementioned humidity conditions, the post-processing can be carried out easily.

Preferably, in the water vapor introduction step, the atmosphere has a temperature of not lower than 30° C., more preferably not lower than 60° C. Preferably, in the dehydration processing step, the atmosphere has a temperature of not lower than 30° C., more preferably not lower than 40° C., even more preferably not lower than 70° C., yet more preferably not lower than 100° C. For example, the atmosphere in the water vapor introduction step has a temperature of not lower than 30° C., and the atmosphere in the dehydration processing step has a temperature of not lower than 40° C.

By adopting the aforementioned temperature conditions, it is possible to set the aforementioned humidity conditions.

Preferably, in the dehydration processing step, the base member undergoes a vacuum process or a purging process.

According to this aspect of the present invention, by carrying out the vacuum process or the purging process, it is possible to set the atmosphere in the dehydration processing step to the atmosphere containing little water vapor.

In order to attain the aforementioned object, the present invention is also directed to an organic film formed by the above-described method and including a non-crystalline layer.

According to this aspect of the present invention, since the organic layer includes the non-crystalline layer, then in the post-processing step, it is possible to bond together the reactive functional groups of the silane coupling agent that have not yet reacted, and therefore the durability and smoothness of the organic film can be improved.

Preferably, arithmetic mean roughness of a surface of the organic film after the post-processing step is less than arithmetic mean roughness of the surface of the organic film before the post-processing step.

According to the above-described method of forming the organic film, it is possible to smooth the organic film by the post-processing step, and hence the surface roughness can be reduced through the post-processing step.

Preferably, a thickness of the organic film after the post-processing step is not less than 70% and not more than 100% with respect to the thickness of the organic film before the post-processing step.

According to the above-described method of forming the organic film, the organic film is smoothed by bonding the reactive functional groups that have not yet reacted, in contrast to the methods involving fluoric solvent or mechanical removal in the related art, and therefore it is possible to suppress reduction of the film thickness. Consequently, it is possible to keep the thickness of the organic film after the post-processing step to a range of 70% or more and 100% or less compared to the thickness of the organic film before the post-processing step.

Preferably, the organic film contains fluorine.

According to this aspect of the present invention, although siloxane bonds have low durability with respect to alkalis, the organic film contains fluorine and therefore has liquid-repellent properties, thus giving the organic film high durability with respect to alkalis.

In order to attain the aforementioned object, the present invention is also directed to a nozzle plate comprising: a base member; and an organic film formed by the above-described method and having siloxane bonds with the base member. The present invention is also directed to an inkjet head comprising the nozzle plate. The present invention is also directed to an electronic device comprising the inkjet head.

Since the above described organic film has improved durability and high smoothness, then it is desirable for use in the nozzle plate, the inkjet head and the electronic device.

According to the method of forming the organic film in the present invention, the reactive functional groups which have not yet reacted are bonded by the post-processing step, and furthermore the sites which have been bonded through hydrogen bonds having weak bonding force are converted to siloxane bonds by the dehydration processing, thus making it possible to form the organic film having high durability and smoothness. The organic film thus formed is desirable for use in a nozzle plate, an inkjet head, and an electronic device.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

General Configuration of Inkjet Recording Apparatus

Figure 1:
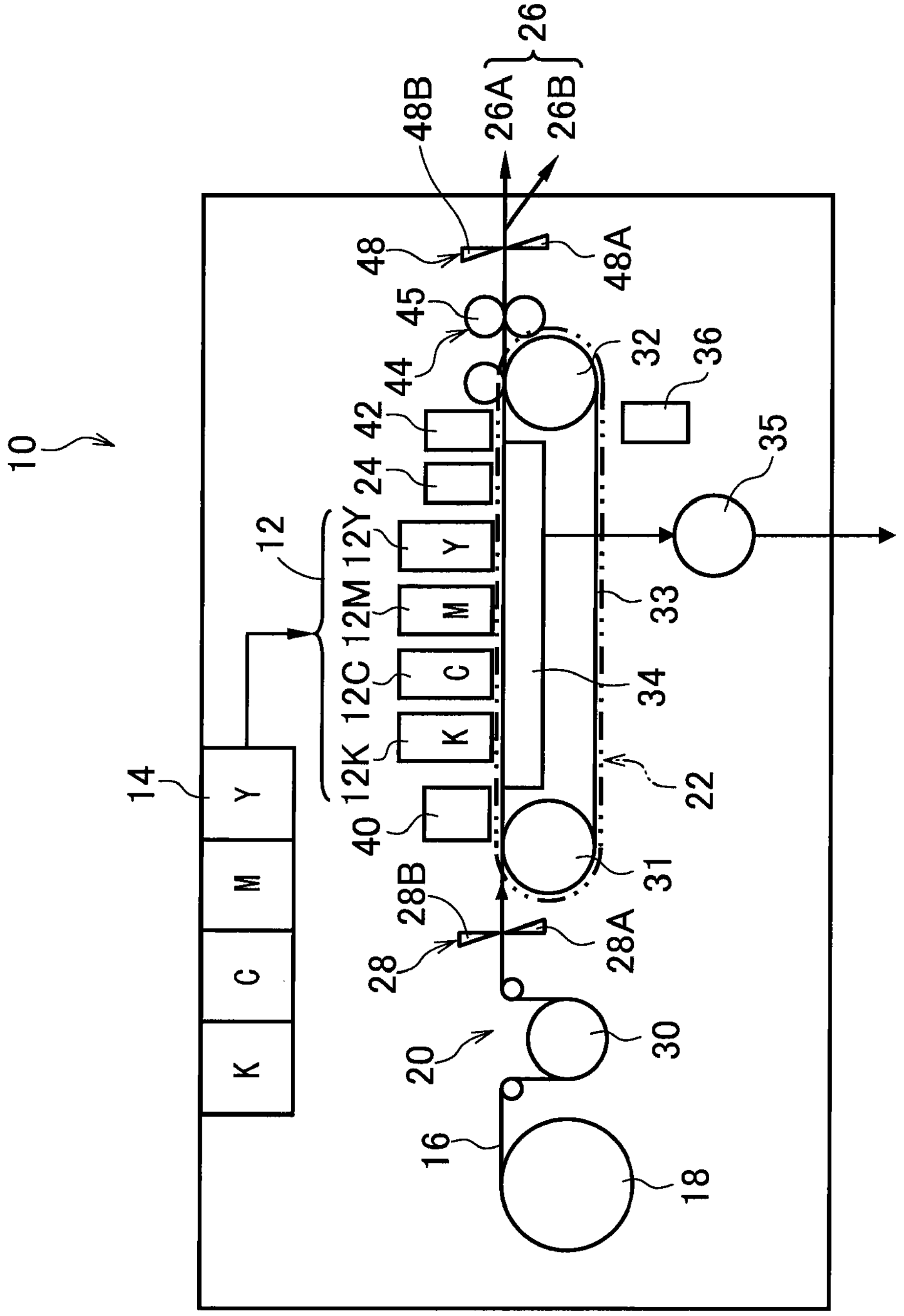
FIG. 1 is a general schematic drawing showing a general view of an inkjet recording apparatus.

FIG. 1 is a general configuration diagram of an inkjet recording apparatus according to an embodiment of the present invention. As illustrated in FIG. 1, the inkjet recording apparatus 10 includes: a printing unit 12 having a plurality of inkjet heads (hereafter, also simply called "heads") 12K, 12C, 12M, and 12Y provided for the respective ink colors of black (K), cyan (C), magenta (M) and yellow (Y); an ink storing and loading unit 14 for storing inks of K, C, M and Y to be supplied to the printing heads 12K, 12C, 12M, and 12Y; a paper supply unit 18 for supplying recording paper 16; a decurling unit 20 removing curl in the recording paper 16; a suction belt conveyance unit 22 disposed facing the nozzle face (ink-droplet ejection face) of the printing unit 12, for conveying the recording paper 16 while keeping the recording paper 16 flat; a print determination unit 24 for reading the printed result produced by the printing unit 12; and a paper output unit 26 for outputting image-printed paper (printed matter) to the exterior.

In FIG. 1, a magazine for rolled paper (continuous paper) is shown as an example of the paper supply unit 18; however, more magazines with paper differences such as paper width and quality may be jointly provided. Moreover, papers may be supplied with cassettes that contain cut papers loaded in layers and that are used jointly or in lieu of the magazine for rolled paper.

In the case of the configuration in which roll paper is used, a cutter 28 is provided as illustrated in FIG. 1, and the continuous paper is cut into a desired size by the cutter 28. The cutter 28 has a stationary blade 28A, whose length is not less than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyor pathway. When cut papers are used, the cutter 28 is not required.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a plane.

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as illustrated in FIG. 1. The suction chamber 34 provides suction with a fan 35 to generate a negative pressure, and the recording paper 16 on the belt 33 is held by suction.

The belt 33 is driven in the clockwise direction in FIG. 1 by the motive force of a motor (not shown) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with cleaning rollers such as a brush roller and a water absorbent roller, an air blow configuration in which clean air is blown onto the belt 33, and a combination of these. In the case of the configuration in which the belt 33 is nipped with the cleaning rollers, it is preferable to make the line velocity of the cleaning rollers different from that of the belt 33 to improve the cleaning effect.

A roller nip conveyance mechanism, in place of the suction belt conveyance unit 22, can be employed. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Figure 2:
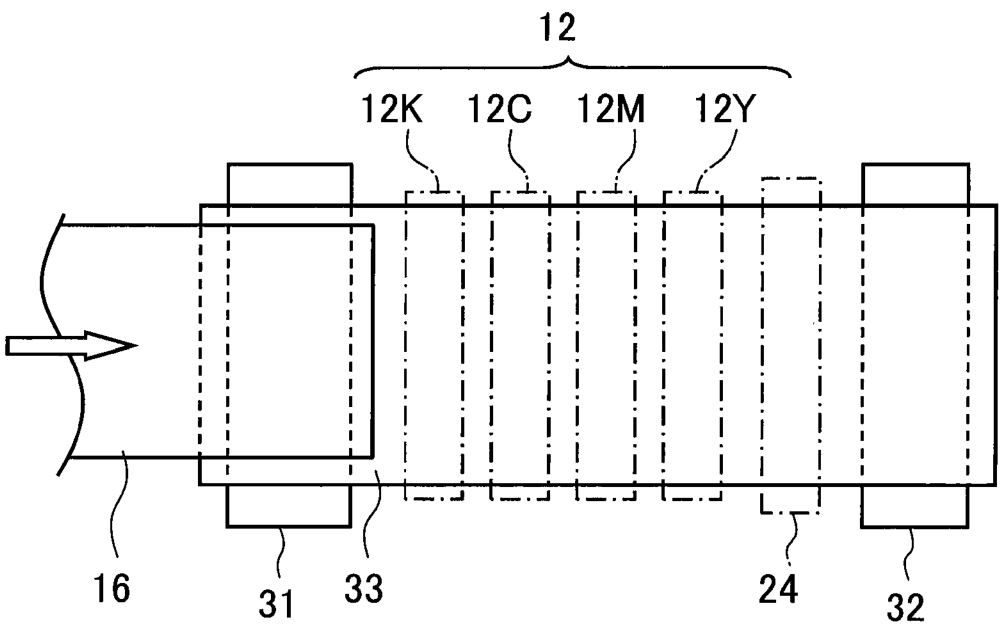
FIG. 2 is a principal part plan diagram of the periphery of a print unit of the inkjet recording apparatus in FIG. 1.

The printing unit 12 is a so-called "full line head" in which a line head having a length corresponding to the maximum paper width is arranged in a direction (main scanning direction) that is perpendicular to the paper conveyance direction (sub scanning direction). Each of the printing heads 12K, 12C, 12M, and 12Y constituting the printing unit 12 is constituted by a line head, in which a plurality of ink ejection ports (nozzles) are arranged along a length that exceeds at least one side of the maximum-size recording paper 16 intended for use in the inkjet recording apparatus 10 (see FIG. 2).

The printing heads 12K, 12C, 12M, and 12Y are arranged in the order of black (K), cyan (C), magenta (M) and yellow (Y) from the upstream side, along the feed direction of the recording paper 16 (hereinafter referred to as the "sub-scanning direction"). A color image can be formed on the recording paper 16 by ejecting the inks from the printing heads 12K, 12C, 12M, and 12Y, respectively, onto the recording paper 16 while conveying the recording paper 16.

By adopting the printing unit 12 in which the full line heads covering the full paper width are provided for the respective ink colors in this way, it is possible to record an image on the full surface of the recording paper 16 by performing just one operation of relatively moving the recording paper 16 and the printing unit 12 in the paper conveyance direction (the sub-scanning direction), in other words, by means of a single sub-scanning action. Higher-speed printing is thereby made possible and productivity can be improved in comparison with a shuttle type head configuration in which a head reciprocates in a direction (the main scanning direction) orthogonal to the paper conveyance direction.

Although the configuration with the KCMY four standard colors is described in the present embodiment, combinations of the ink colors and the number of colors are not limited to those. Light inks or dark inks can be added as required. For example, a configuration is possible in which heads for ejecting light-colored inks such as light cyan and light magenta are added. Furthermore, there are no particular restrictions of the sequence in which the heads of respective colors are arranged.

As illustrated in FIG. 1, the ink storing and loading unit 14 has tanks for storing the inks of K, C, M and Y to be supplied to the heads 12K, 12C, 12M, and 12Y, and the tanks are connected to the heads 12K, 12C, 12M, and 12Y by means of channels (not shown). The ink storing and loading unit 14 has a warning device (for example, a display device or an alarm sound generator) for warning when the remaining amount of any ink is low, and has a mechanism for preventing loading errors among the colors.

The print determination unit 24 has an image sensor (line sensor) for capturing an image of the ink-droplet deposition result of the printing unit 12, and functions as a device to check for ejection defects such as clogs of the nozzles in the printing unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the heads 12K, 12C, 12M, and 12Y. This line sensor has a color separation line CCD sensor including a red (R) sensor row composed of photoelectric transducing elements (pixels)

arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

The print determination unit 24 reads a test pattern image printed by the heads 12K, 12C, 12M, and 12Y for the respective colors, and the ejection of each head is determined. The ejection determination includes measurement of the presence of the ejection, measurement of the dot size, and measurement of the dot deposition position.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substances that cause dye molecules to break down, and has the effect of increasing the durability of the print.

A heating/pressing unit 44 is disposed following the post-drying unit 42. The heating/pressing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathways in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not illustrated in FIG. 1, the paper output unit 26A for the target prints is provided with a sorter for collecting prints according to print orders.

Structure of Head

Next, the structure of heads 12K, 12C, 12M and 12Y will be described. The heads 12K, 12C, 12M and 12Y of the respective ink colors have the same structure, and a reference numeral 50 is hereinafter designated to any of the heads.

Figure 3A:
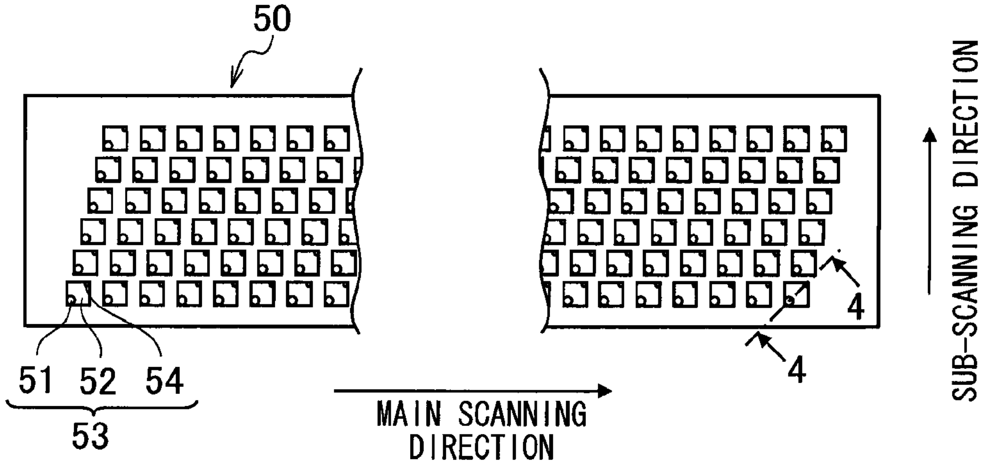
FIGS. 3A to 3C are plan view perspective diagrams showing embodiments of the composition of a head.
Figure 3B:
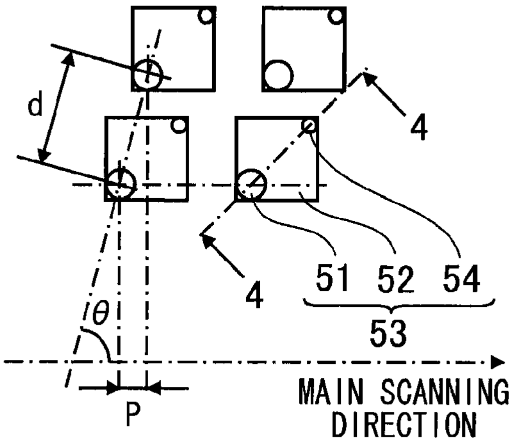
Figure 3C:
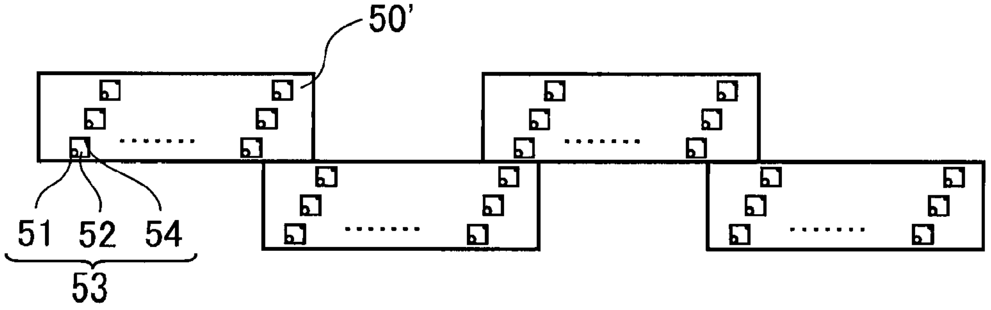
Figure 4:
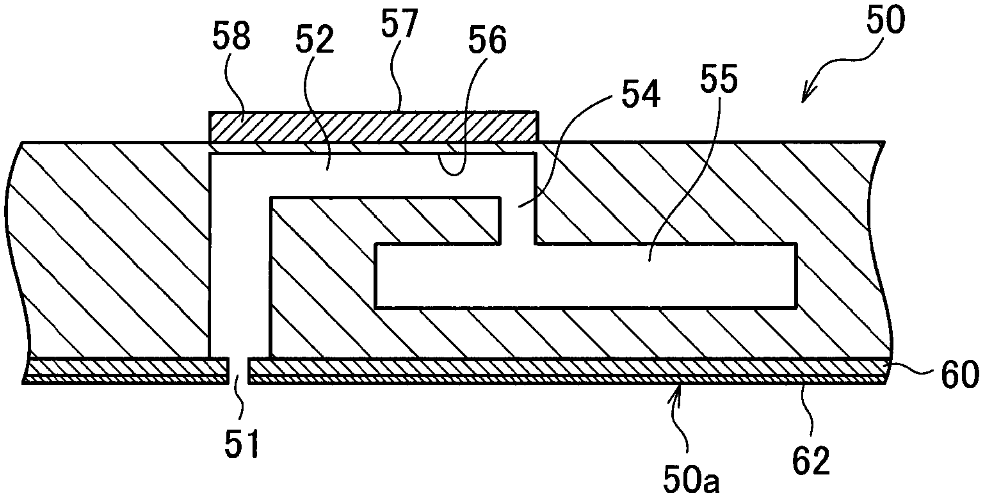
FIG. 4 is a cross-sectional diagram along line 4-4 in FIGS. 3A and 3B.

FIG. 3A is a plan perspective diagram showing an example of the structure of a head 50, and FIG. 3B is a partial enlarged diagram of same. Moreover, FIG. 3C is a plan view perspective diagram showing a further example of the structure of the head 50. FIG. 4 is a cross-sectional diagram showing the composition of an ink chamber unit (a cross-sectional diagram along line 4-4 in FIGS. 3A and 3B).

The nozzle pitch in the head 50 should be minimized in order to maximize the density of the dots formed on the surface of the recording paper. As illustrated in FIGS. 3A and 3B, the head 50 according to the present embodiment has a structure in which a plurality of ink chamber units 53, each having a nozzle 51 serving as an ink droplet ejection aperture, a pressure chamber 52 corresponding to the nozzle 51, and the like, are disposed two-dimensionally in the form of a staggered matrix, and hence the effective nozzle interval (the projected nozzle pitch) as projected in the lengthwise direction of the head (the main scanning direction perpendicular to the paper conveyance direction) is reduced and high nozzle density is achieved.

The mode of forming one or more nozzle rows through a length corresponding to the entire width of the recording paper 16 in a direction substantially perpendicular to the paper conveyance direction is not limited to the example described above. For example, instead of the configuration in FIG. 3A, as illustrated in FIG. 3C, a line head having nozzle rows of a length corresponding to the entire width of the recording paper 16 can be formed by arranging and combining, in a staggered matrix, short head blocks (head chips) 50' having a plurality of nozzles 51 arrayed in a two-dimensional fashion. Furthermore, although not shown in the drawings, it is also possible to compose a line head by arranging short heads in one row.

As shown in FIG. 4, the nozzles 51 are formed in a nozzle plate 60, which constitutes an ink ejection surface 50*a* of the head 50. The nozzle plate 60 is made, for example, of a silicon-containing material such as Si, $SiO_2$, SiN or quartz glass, a metal material such as Al, Fe, Ni, Cu or an alloy containing these, an oxide material such as alumina or iron oxide, a carbon material such as carbon black or graphite, or a resin material such polyimide.

An organic film 62 having liquid-repellent properties with respect to ink is formed on the surface (ink ejection side surface) of the nozzle plate 60, thereby preventing adherence of ink. The method of forming the organic film 62 is described in detail below.

The head 50 is provided with the pressure chambers 52 correspondingly to the nozzles 51. The pressure chamber 52 is approximately square-shaped in planar form, and the nozzle 51 and a supply port 54 are arranged respectively at either corner on a diagonal of the pressure chamber 52. The pressure chambers 52 are connected to a common flow channel 55 through the supply ports 54. The common flow channel 55 is connected to an ink tank (not shown) serving as an ink supply source. The ink is supplied from the ink tank and distributed to the pressure chambers 52 through the common flow channel 55.

Piezoelectric elements 58 respectively provided with individual electrodes 57 are bonded to a diaphragm 56 which forms the upper face of the pressure chambers 52 and also serves as a common electrode, and each piezoelectric element 58 is deformed when a drive voltage is supplied to the corresponding individual electrode 57, thereby causing ink to be ejected from the corresponding nozzle 51. When the ink is ejected, new ink is supplied to the pressure chambers 52 from the common flow channel 55 through the supply ports 54.

In the present embodiment, the piezoelectric element 58 is used as an ink ejection force generating device which causes ink to be ejected from the nozzle 51 provided in the head 50, but it is also possible to employ a thermal method in which a heater is provided inside the pressure chamber 52 and ink is ejected by using the pressure of the film boiling action caused by the heating action of this heater.

As illustrated in FIG. 3B, the high-density nozzle head according to the present embodiment is achieved by arranging a plurality of ink chamber units 53 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which the ink chamber units 53 are arranged at a uniform pitch d in line with a direction forming an angle of θ with respect to the main scanning direction, the pitch P of the nozzles projected so as to align in the main scanning direction is d×cos θ, and hence the nozzles 51 can be regarded to be equivalent to those arranged linearly at a fixed pitch P along the main scanning direction. Such configuration results in a nozzle structure in which the nozzle row projected in the main scanning direction has a high nozzle density of up to 2,400 nozzles per inch.

When implementing the present invention, the arrangement structure of the nozzles is not limited to the example shown in the drawings, and it is also possible to apply various other types of nozzle arrangements, such as an arrangement structure having one nozzle row in the sub-scanning direction.

Furthermore, the scope of application of the present invention is not limited to a printing system based on a line type of head, and it is also possible to adopt a serial system where a short head which is shorter than the breadthways dimension of the recording paper 16 is scanned in the breadthways direction (main scanning direction) of the recording paper 16, thereby performing printing in the breadthways direction, and when one printing action in the breadthways direction has been completed, the recording paper 16 is moved through a prescribed amount in the direction perpendicular to the breadthways direction (the sub-scanning direction), printing in the breadthways direction of the recording paper 16 is carried out in the next printing region, and by repeating this sequence, printing is performed over the whole surface of the printing region of the recording paper 16.

Method of Forming Organic Film

Next, the method of forming the organic film according to the present embodiment is described. The following description relates to a liquid-repellent film formed on an inkjet nozzle plate with a silane coupling agent.

Figure 5A:
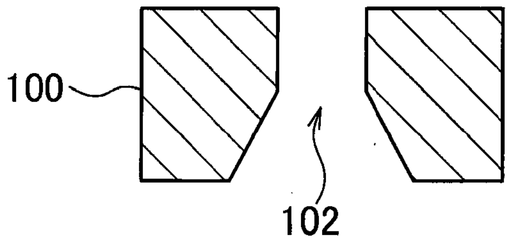
FIGS. 5A and 5B are step diagrams for describing formation of an organic film according to an embodiment of the present invention.
Figure 5B:
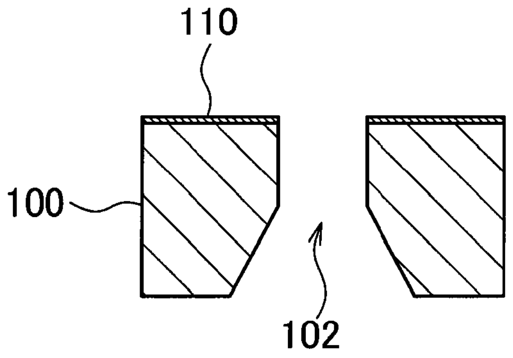

FIGS. 5A and 5B are step diagrams for describing a method of forming an organic film. Here, a case is described in which an organic film 110 (corresponding to the organic film 62 in FIG. 4) is formed on the surface (ink ejection surface side) of a base member 100 (corresponding to the nozzle plate 60 in FIG. 4) as shown in FIG. 5B; however, the present invention is not limited to this and can also be applied suitably to cases of forming any organic film using a silane coupling agent.

The method of forming the organic film according to the present embodiment includes: (1) an organic film formation step of forming an organic film from a silane coupling agent on the surface of the base member; and post-processing steps including (2) a water vapor introduction step of holding the base member on which the organic film has been formed, in an atmosphere containing at least water vapor, and (3) a dehydration processing step of holding the base member in an atmosphere having a smaller presence of water vapor compared to the atmosphere of the water vapor introduction step.

<Organic Film Formation Step>

(1) Organic Film Formation Step (1A) Method of Direct Forming on the Base Member The organic film formation step is a step of forming an organic film 110 on the surface of the base member 100, as shown in FIGS. 5A and 5B.

The base member 100 can be made of metal, organic material, inorganic material, or the like. Although there are no particular restrictions on the material of which the base member 100 is made, it is desirable that the surface of the base member 100 where an organic film (a liquid-repellent film) is to be formed is covered with a layer containing at least silicon. By forming the layer containing silicon, it is possible to strengthen the adhesion with the silane coupling agent. It is also desirable that the surface of the base member 100 is covered with a natural oxide film, an oxide film formed by CVD or the like, a thermal oxide film, and the like.

The silane coupling agent is a silicon compound represented by $Y_nSiX_{4-n}$(n=1, 2, 3), where Y includes a relatively inert group, such as an alkyl group, or a reactive group, such as a vinyl group, an amino group, or an epoxy group; and X includes a group that can be bonded to a hydroxyl group or adsorption water on the substrate surface by condensation, such as a halogen, a methoxy group, an ethoxy group or an acetoxy group. A silane coupling agent is widely used in the manufacture of composite materials constituted of an organic material and an inorganic material, such as glass fiber-reinforced plastics, in order to mediate in the bonds between the materials. If Y is an inert group, such as an alkyl group, then adherence to or abrasion of the modified surface is prevented and characteristics such as sustained gloss, water-repellent properties, lubricating properties, and the like, are imparted to the surface. If Y includes a reactive group, then this is used principally to improve adhesiveness. Moreover, a surface that has been modified by using a fluorine type silane coupling agent having a carbon fluoride straight-chain introduced in Y has low surface free energy, like the surface of PTFE (polytetrafluoroethylene), and hence the characteristics, such as water-repellent properties, lubricating properties, mold separation, and the like, are improved, and oil-repelling properties are also displayed.

In the present embodiment, an organic film having liquid-repellent properties is formed with a fluorine type silane coupling agent (chlorine type, methoxy type, ethoxy type, isocyanate type, or the like). For the liquid-repellent film, it is possible to use a metal alkoxide liquid-repellent film, a silicone liquid-repellent film, a fluorine-containing liquid-repellent film or the like, which is formed by a dry process, such as a physical vapor epitaxy method (vapor deposition method, sputtering method, or the like), or a chemical vapor epitaxy method (CVD method, ALD method, or the like), or a wet process, such as sol gelation, an application method, or the like (commercially available fluorine-containing liquid-repellent films include Cytop manufactured by Asahi Glass or NANOS manufactured by T&K, which have superior adhesiveness to the silicon base member, and a film which is capable of siloxane bonding and has a CF group on the film surface, such as the silane coupling agent sold by Gelest, is also suitable).

In particular, by including fluorine in the organic film, it is possible to impart liquid-repellent properties to the organic film. Consequently, although siloxane bonds have low durability with respect to alkalis, the organic film can repel the alkaline solution and then have durability with respect to alkaline liquids.

(1B) Method of Forming on Plasma Polymerization Film

Figure 6A:
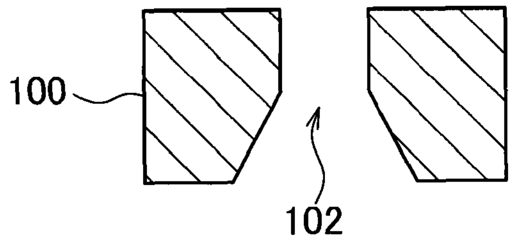
FIGS. 6A to 6C are step diagrams for describing formation of an organic film according to another embodiment of the present invention.
Figure 6B:
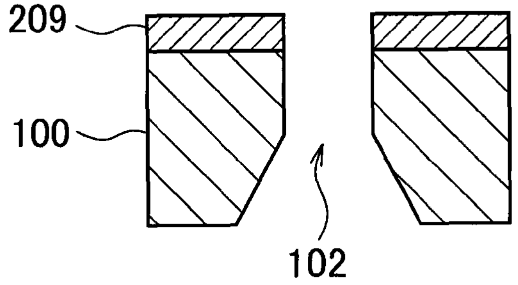
Figure 6C:
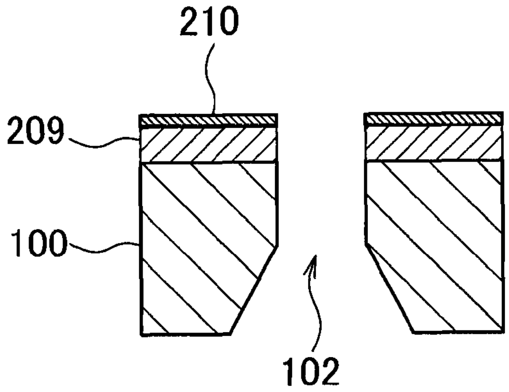

FIGS. 6A to 6C show step diagrams for describing a method of forming the organic film 108 onto a plasma polymerization film 209 on the base member 100. The method of forming the organic film includes: (1B-1) an intermediate layer formation step of forming an intermediate layer constituted of a plasma polymerization film on the surface of the base member, (1B-2) an oxidization processing step of carrying out oxidization of the intermediate layer (plasma polymerization film) formed on the surface of the base member, and (1B-3) an organic film formation step of forming the organic film on the surface of the intermediate layer that has undergone oxidization.

(1B-1) Intermediate Layer Formation Step

When forming the organic film on the plasma polymerization film, firstly, the intermediate layer 209 (FIG. 6B) constituted of a plasma polymerization film is deposited on the surface of the base member 100.

For the material constituting the intermediate layer (plasma polymerization film) 209 and the forming method (film forming method), it is desirable to use the materials and method described in Japanese Patent Application Publication No. 2008-105231.

More specifically, possible examples of the constituent material of the intermediate layer 209 are: silicone materials such as organopolysiloxane, or silane compounds such as alkoxysilane, or the like. Of these, silicone materials are desirable, and organopolysiloxane is particularly desirable. By using organopolysiloxane in the intermediate layer 209, a structure having a framework of siloxane bonds (Si—O) is obtained, and therefore easy bonding with the constituent material (silicon material, or the like) of the base member 100 is achieved, and the plasma polymerization film can be formed readily.

Of organopolysiloxanes, it is desirable to use alkyl polysiloxane. Since alkyl polysiloxane is a polymer compound, then it is possible to form a polymer film on the base member 100. Since each polymer molecule includes an alkyl group, then there are few steric constraints on the polymer structure and a film having regularly ordered molecules can be formed. Moreover, of alkyl polysiloxanes, dimethyl polysiloxane is particularly desirable. Dimethyl polysiloxane is easy to manufacture and therefore can be procured readily. It has high reactivity and therefore methyl groups can be severed easily when an oxidization process such as that described below is applied to the intermediate layer 209.

The method of forming the intermediate layer (plasma polymerization film) 209 may be plasma polymerization, vapor deposition, processing with a silane coupling agent, a process employing a liquid material containing polyorganosiloxane, or the like, and one or more of these methods may be used in combination.

Of these methods, using a plasma polymerization method is preferable. By using plasma polymerization, a plasma of organopolysiloxane is created, and it is then possible to form the intermediate layer (plasma polymerization film) 209 of uniform properties and uniform thickness.

(1B-2) Oxidization Processing Step

Next, the oxidization processing step is carried out on the surface of the intermediate layer (plasma polymerization film) 209 in a process gas atmosphere having a dew point of −40° C. to 20° C., desirably −40° C. to −20° C., so that hydroxyl groups and/or adsorption water is introduced.

For the conditions relating to the process gas and the method of the oxidization process, and the like, it is desirable to use the conditions, method, and the like, described in Japanese Patent Application Publication No. 2008-105231.

More specifically, as the oxidization processing method, it is possible to employ a method which irradiates a beam of energy, such as ultraviolet light or plasma. According to this method, it is possible to carry out an oxidization process only in the region that is irradiated with the energy beam, and therefore $SiO_2$ can be formed efficiently.

In particular, in the present embodiment, of methods which irradiate an energy beam, a method which carries out an oxidization process using plasma irradiation is preferable. When plasma irradiation is used as the oxidization process, possible examples of a gas generating the plasma are: oxygen gas, nitrogen gas, hydrogen gas or inert gas (argon gas, helium gas, or the like), and it is possible to use to one or more of these gases.

The atmosphere in which plasma irradiation is carried out may be either at atmospheric pressure or reduced pressure, and atmospheric pressure is desirable. By this means, oxygen atoms are introduced efficiently from oxygen molecules present in the atmosphere, virtually at the same time as the severing of the bonds between alkyl groups and silicon, and therefore polyorganosiloxane can be changed more rapidly into $SiO_2$.

In particular, in plasma irradiation, it is desirable to use oxygen plasma irradiation employing a gas containing oxygen as the gas that generates the plasma. If oxygen plasma irradiation is used, oxygen plasma severs the bonds between alkyl groups and silicon, as well as being used to bond silicon as oxygen atoms, and therefore it is possible to change polyorganosiloxane into $SiO_2$ more reliably.

The plasma irradiation can be carried out either under closed conditions (for example, in a chamber) or open conditions, and closed conditions are desirable. By this means, the intermediate layer (plasma polymerization film) 209 is oxidized in a state of higher plasma density and therefore it is possible to introduce a greater number of hydroxyl groups into the intermediate layer (plasma polymerization film) 209.

(1B-3) Organic Film Formation Step

Next, as shown in FIG. 6C, the organic film 210 is formed on the surface of the intermediate layer (plasma polymerization film) 209 that has undergone the oxidization process.

There are no particular restrictions on the organic film 210, provided that it can form siloxane bonds with the intermediate layer (plasma polymerization film) 209, and it is possible to employ a metal alkoxide liquid-repellent film, a fluorine-containing plasma polymerization film, a silicone plasma polymerization liquid-repellent film, or the like, and of these, a plasma polymerization film, such as a fluorine-containing plasma polymerization film, a silicone plasma polymerization liquid-repellent film, or the like, is especially desirable.

As the method of forming the organic film constituted of a plasma polymerization film, it is desirable to use a method described in Japanese Patent Application Publication No. 2004-106203. That is, it is possible to form the plasma polymerization film (organic film) by using a known plasma treatment apparatus. For the raw material of the organic film, a gas formed by vaporizing a low-molecular-weight siloxane, such as a liquid siloxane, is used. According to requirements, a rare gas, such as argon or helium, or a gas having oxidizing power, such as oxygen or carbon dioxide, or the like, is mixed with this raw material gas. By this means, it is possible to layer the raw material on the base member 100 in a polymerized state.

As stated above, the organic film constituted of a plasma polymerization film is formed by taking a low-molecular-weight siloxane (a compound having a siloxane bond) as a raw material and carrying out plasma polymerization of this raw material, and the organic film has excellent resistance to metal salts and is extremely suitable as a liquid-repellent layer of a nozzle plate for aqueous pre-treatment liquid (metal salt solution) that contains a metal salt as an ink aggregating agent.

As the method of forming the metal alkoxide liquid-repellent film, it is desirable to use a method described in Japanese Patent Application Publication No. 2008-105231. More specifically, it is possible to use processes of various types, such as a liquid phase process or a gas phase process, and of these, it is desirable to use a liquid phase process, whereby an organic film constituted of a metal alkoxide can be formed by means of a relatively simple process.

As described above, the oxidization process (and desirably, oxidization by plasma irradiation) is performed on the intermediate layer (plasma polymerization film) 209 formed on the surface of the base member 100, hydroxyl groups and/or adsorption water is introduced, and the organic film 210 is formed on the intermediate layer 209 that has undergone oxidization. Thus, it is possible to form the uniform organic film 210 having high adhesiveness and excellent wear resistance on the surface side of the base member 100.

Consequently, it is possible to improve ink ejection performance and reliability which are important factors in an inkjet head, and improvement in image quality can be achieved.

(1C) Method of Forming Step Structure

The method of forming the organic film shown in FIGS. 7A to 7I is includes: (1C-1) a step of forming a first plasma polymerization film 304 on the surface of the base member 100 (FIG. 7A) (first plasma polymerization film formation step); (1C-2) a step of carrying out hydrogen plasma treatment to the first plasma polymerization film 304 (hydrogen plasma treatment step); (1C-3) a step of forming a second plasma polymerization film 306 on the first plasma polymerization film 304 (second plasma polymerization film formation step); (1C-4) a step of forming a mask 308 on the second plasma polymerization film 306 (mask formation step); (1C-5) a step of carrying out an oxidization process (or etching process) on the second plasma polymerization film 306 using the mask 308 (step formation step); (1C-6) a step of removing the mask 308 (mask removal step); (1C-7) a step of carrying out an oxidization process on the surfaces (liquid-repellent film formation surfaces) of the first and second plasma polymerization films 304 and 306 (oxidization processing step); and [1C-8] a step of forming an organic film 320 on the surfaces of the first and second plasma polymerization films 304 and 306 which have undergone the oxidization processing (organic film formation step).

(1C-1) First Plasma Polymerization Film Formation Step

Figure 7A:
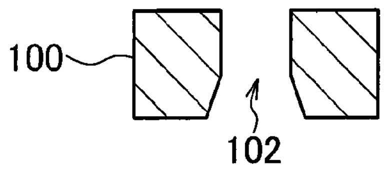
FIGS. 7A to 7I are step diagrams for describing formation of an organic film according to yet another embodiment of the present invention.
Figure 7B:
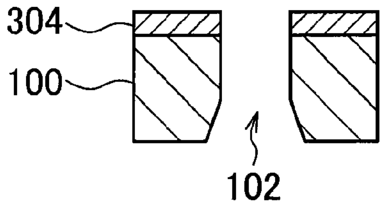

Firstly, as shown in FIG. 7B, the first plasma polymerization film 304 is formed on the base member 100. The first plasma film formation step can be carried out using a similar method to that of the intermediate layer formation step (1B-1).

(1C-2) Hydrogen Plasma Treatment Step

Figure 7C:
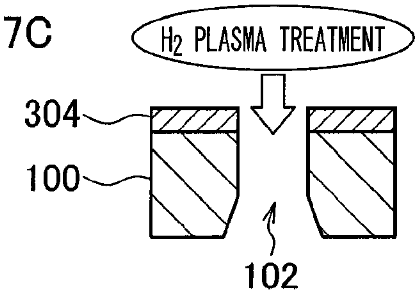

Next, as shown in FIG. 7C, hydrogen plasma treatment is carried out onto the first plasma polymerization film 304, thereby improving the plasma resistance of the first plasma polymerization film 304. By this means, the first plasma polymerization film 304 is able to function as an etching stop layer in the oxidization process (or etching process) carried out in the step formation step, which is performed subsequently.

The following three types of methods can be used for the hydrogen plasma treatment:

(1) Irradiation of $H_2$ plasma;

(2) Irradiation of plasma of process gas containing $H_2$ and inert gas; and (3) Irradiation of plasma of process gas containing substance including hydrogen and inert gas.

As regards the conditions of $H_2$ plasma irradiation, $H_2$ is supplied to the chamber and the internal pressure of the chamber is set to a prescribed value, desirably no greater than 13.3 Pa (100 mTorr), for instance, a pressure of 6.7 Pa (50 mTorr). In this state, high-frequency power is applied to the electrodes, the process gas is converted into a plasma, and $H_2$ plasma is irradiated onto the plasma polymerization film.

Although the detailed mechanism of improving plasma resistance is not necessarily clear, it is thought that the plasma containing H promotes a cross-linking reaction in the first plasma polymerization film 304 and changes C—O bonds and C—H bonds to C—C bonds, thereby strengthening the chemical bonds and improving the resistance to plasma. The substance including hydrogen is desirably $H_2$ or $NH_3$, due to ease of handling. For example, it is possible to improve the plasma resistance of the first plasma polymerization film 304 by means of a hydrogen plasma process using $H_2$+$N_2$ process gas.

(1C-3) Second Plasma Polymerization Film Formation Step

Figure 7D:
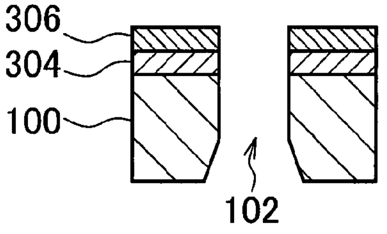

Next, as shown in FIG. 7D, the second plasma polymerization film 306 is formed on the first plasma polymerization film 304 that has undergone the hydrogen plasma treatment.

In this step, the material used as the constituent material of the second plasma polymerization film 306 is the same as the constituent material of the above-described first plasma polymerization film 304. By layering the plasma polymerization films 304 and 306 made of the same material, it is possible to maintain a state of high adhesiveness between the plasma polymerization films.

There are no particular restrictions on the methods of forming the second plasma polymerization film 306, and desirably the methods are the same as the methods for forming the first plasma polymerization film 304 described above, and of these methods, the plasma polymerization is preferable.

(1C-4) Mask Formation Step

Figure 7E:
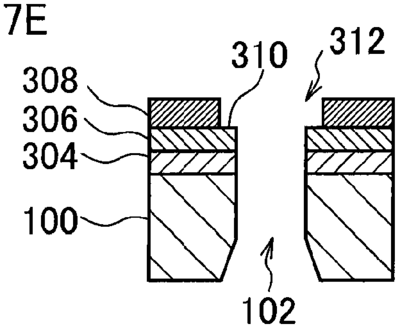

Next, as shown in FIG. 7E, the mask 308 having a prescribed pattern is formed on the second plasma polymerization film 306.

The mask 308 has an opening section 312 of a prescribed shape that encompasses an outer perimeter portion 310, which corresponds to the outer perimeter of the nozzle hole 102, in the second plasma polymerization film 306. In other words, a structure is adopted in which the outer perimeter portion 310 of the second plasma polymerization film 306 is not covered with the mask 308, but rather is exposed through the opening section 312.

In the embodiment depicted in the drawings, the mask 308 has the opening sections 312 at positions corresponding to the nozzle holes 102, and each opening section 312 has a circular shape which has a larger diameter than the inner diameter of the nozzle hole 102. The shape of the opening section 312 in the mask 308 is not limited in particular provided that it is a shape whereby at least the outer perimeter portion 310 of the nozzle hole 102 in the second plasma polymerization film 306 is exposed, and it may be a shape that encompasses the outer perimeter portions 310 corresponding to a plurality of nozzle holes 102 (for example, a band shape, or the like).

There are no particular restrictions on the constituent material of the mask 308, provided that it has resistance to the oxidization process (or the etching process) which is carried out in the step formation step that is performed subsequently, in other words, provided that it has a function of shielding the energy beam that is irradiated in the subsequent process; for example, the material of the mask may be a metal, such as aluminum, glass (having a function of shielding ultraviolet light), ceramics of various kinds, silicone, or the like.

Furthermore, the method of forming the mask 308 is not limited in particular, and it is possible, for example, to apply a plate-shaped mask 308 having opening sections 312 on the second plasma polymerization film 306. More specifically, the outer perimeter portions 310 and the opening sections 312 of the mask 308 are registered in such a manner that the outer perimeter portions 310 of the nozzle holes 102 in the second plasma polymerization film 306 are exposed, and the mask 308 is then bonded onto the second plasma polymerization film 306. As other forming methods, it is possible to use vapor deposition or photolithography, or the like.

By registering the outer perimeter portions 310 and the opening sections 312 as described above and disposing the mask 308 on the second plasma polymerization film 306, it is possible to carry out selective oxidization processing of the outer perimeter portions 310 which are exposed through the opening sections 312.

(1C-5) Step Formation Step

Figure 7F:
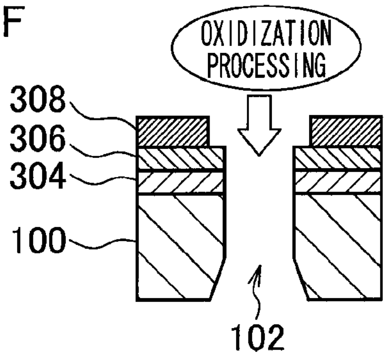
Figure 7G:
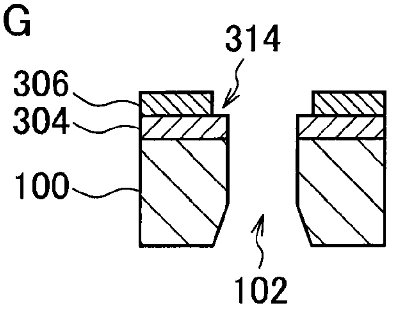

Next, as shown in FIG. 7F, oxidization processing is carried out on the second plasma polymerization film 306 that has been covered with the mask 308, the outer perimeter portion 310 of the second plasma polymerization film 306 is removed and a step structure 314 having a larger diameter than the nozzle hole 102 is formed in the periphery of the opening of the nozzle hole 102 (see FIG. 7G).

When the plasma polymerization film is subjected to oxidization processing, the thickness of the plasma polymerization film is reduced in the portion where oxidization has been carried out, as described in Japanese Patent Application Publication No. 2008-105231. In the present embodiment, these characteristics are used in order to remove selectively the portion that is exposed through the opening section 312 of the mask 308 (in other words, the outer perimeter portion 310 of the second plasma polymerization film 306). The oxidization process can be carried out using a method similar to that of the above-described oxidization processing step (1B-2).

When the oxidization process is carried out on the second plasma polymerization film 306, then due to the function of the mask 308 described above, the portion of the second plasma polymerization film 306 directly below the opening section 312 of the mask 308, in other words, only the outer perimeter portion 310, undergoes the oxidization process selectively. Thereby, alkyl groups terminating the surface in the portion 310 are severed from silicon atoms and $SiO_2$ is formed. The second plasma polymerization film 306 situated inside the opening section 312, in other words, the second plasma polymerization film 306 in the outer perimeter portion 310, is reduced in thickness. In this case, since the first plasma polymerization film 304, which has enhanced plasma resistance due to the hydrogen plasma treatment, functions as an etching stop layer, then the portion of the second plasma polymerization film 306 that is not covered with the mask 308 (in other words, the outer perimeter portion 310) is removed completely and the step structure 314 having a larger diameter than the nozzle hole 102 is formed in the periphery of the opening of the nozzle hole 102. Thus, it is possible to form the step structures 314 showing little variation around the nozzle holes 102, and therefore ejection stability and maintenance properties can be improved.

In the present embodiment, although the oxidization process has been described as the method of removing the outer perimeter portion 310 of the second plasma polymerization film 306, it is also possible to use an etching process instead of the oxidization process.

(1C-6) Mask Removal Step

Next, as shown in FIG. 7G, the mask 308 is removed from the second plasma polymerization film 306.

The method of removing the mask 308 differs according to the type (forming method) of the mask 308. If using the plate-shaped mask 308, for example, it is possible to remove the mask 308 by separation from the second plasma polymerization film 306. If the mask 308 has been formed by vapor deposition or photolithography, or the like, then it is possible to remove the mask 308 by a method of exposing the mask 308 to an oxygen plasma or ozone vapor at atmospheric pressure or reduced pressure, or a method of immersing the mask 308 in a dissolving solution or a separating solution.

(1C-7) Oxidization Processing Step

Figure 7H:
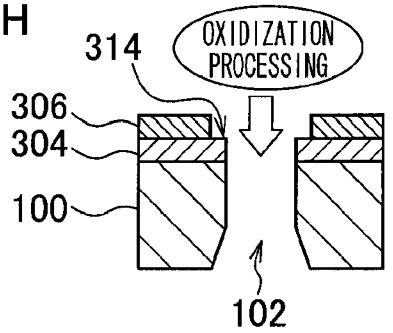

Thereupon, as shown in FIG. 7H, the oxidization processing is carried out onto the surfaces of the plasma polymerization films 304 and 306 (the organic film formation surfaces) which constitute the step structure 314. More specifically, the oxidization process is carried out onto the surfaces of the plasma polymerization films 304 and 306 in a processing gas atmosphere having a dew point of −40° C. to 20° C., desirably −40° C. to −20° C., and hydroxyl groups and/or adsorption water is introduced. Thereby, it is possible to improve the adhesiveness between the liquid-repellent film that is formed in a subsequent step and the plasma polymerization films 304 and 306. The oxidization process can be carried out using a method similar to that of the above-described oxidization processing step (1B-2).

(1C-8) Organic Film Formation Step

Figure 7I:
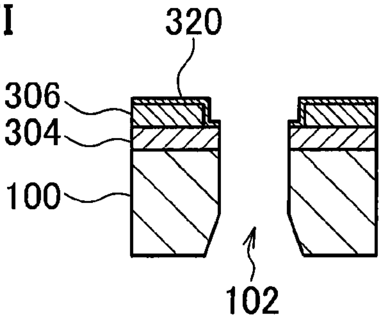

Next, as shown in FIG. 7I, the organic film 320 is formed on the surfaces of the plasma polymerization films 304 and 306 (the organic film formation surfaces) which have undergone the oxidization processing.

There are no particular restrictions on the organic film 320, provided that it can form siloxane bonds with the plasma polymerization films 304 and 306; for example, it is possible to employ a metal alkoxide liquid-repellent film, a fluorine-containing plasma polymerization film, a silicone plasma polymerization liquid-repellent film, or the like, and of these, a plasma polymerization film, such as a fluorine-containing plasma polymerization film, a silicone plasma polymerization liquid-repellent film, or the like, is especially desirable. The organic film formation process can be carried out using a method similar to that of the above-described organic film formation step (1B-3).

The organic film forming methods according to the embodiments of the present invention have been described with reference to the example where an organic film is formed on a nozzle forming substrate as the base member 100; however, the present invention is not limited to this and can also be applied suitably to a case of forming an organic film on a base member (structural body) in which hole sections, such as ink flow channels, are formed.

<Post-Processing Steps>

By carrying out post-processing steps after the organic film formation step, it is possible to impart smoothness to the surface of the organic film and durability to the organic film.

(2) Water Vapor Introduction Step

The water vapor introduction step is a step of holding the base member 100 on which the organic film 110 has been formed, in an atmosphere containing water vapor, and thereby applying water vapor to introduce water to the organic film 110.

The water vapor introduction step can be carried out by placing the base member 100 on which the organic film 110 has been formed, in a humidity-controllable thermostatic chamber. The relative humidity inside the thermostatic chamber is desirably 50% or higher, and more desirably 70% or higher. Moreover, the temperature inside the thermostatic chamber is desirably 30° C. or higher, and more desirably 60° C. or higher. For example, it is desirable that the processing is carried out for one hour or more in the atmosphere having the temperature of 60° C. and the relative humidity of 70%.

Furthermore, the gas other than water vapor inside the thermostatic chamber is desirably an inert gas such as a rare gas, or $N_2$ gas. By using an inert gas, it is possible to prevent contamination, as well as restricting effects on the base member and the organic film.

Figure 8:
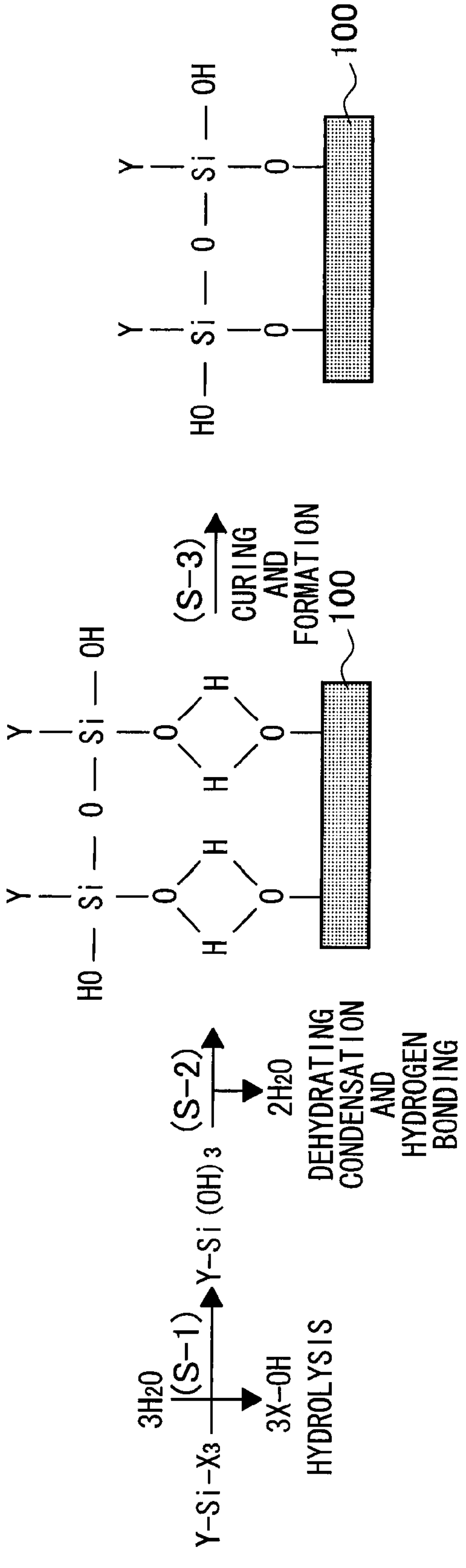
FIG. 8 is a diagram describing a general reaction of a silane coupling agent.

Next, the beneficial effects of the water vapor introduction step are described. FIG. 8 is reaction formulae of a general silane coupling reaction (showing an embodiment where there are three reactive functional groups (X)). Firstly, silanol groups are generated by hydrolyzing the silane coupling agent (S-1). Thereupon, hydrogen bonds are formed between the reaction sites (OH groups) on the base member 100 and the hydrolyzed molecules of the silane coupling agent, a dehydrating condensation reaction also occurs between the molecules of the silane coupling agent themselves, and an organic film based on the silane coupling agent is formed on the base member 100 (S-2). Thereupon, the hydrogen bonds between the base member 100 and the molecules of the silane coupling agent are converted into siloxane bonds by a dehydrating condensation reaction, thereby making it possible to form a strong film (S-3).

Figure 9A:
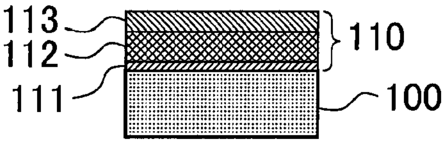
FIGS. 9A to 9D are diagrams for describing post-processing steps of the organic film according to an embodiment of the present invention.
Figure 9B:
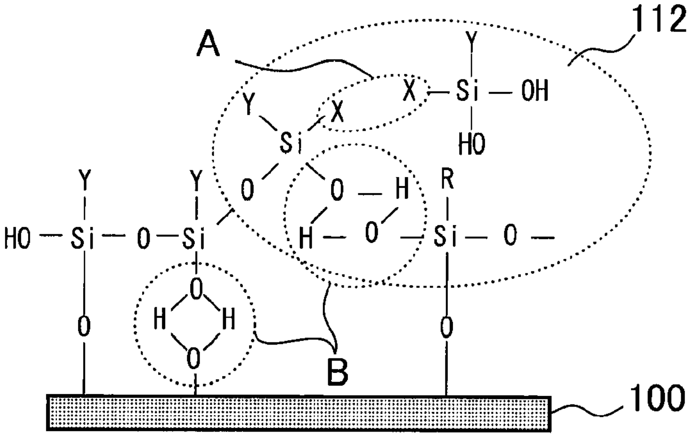
Figure 9C:
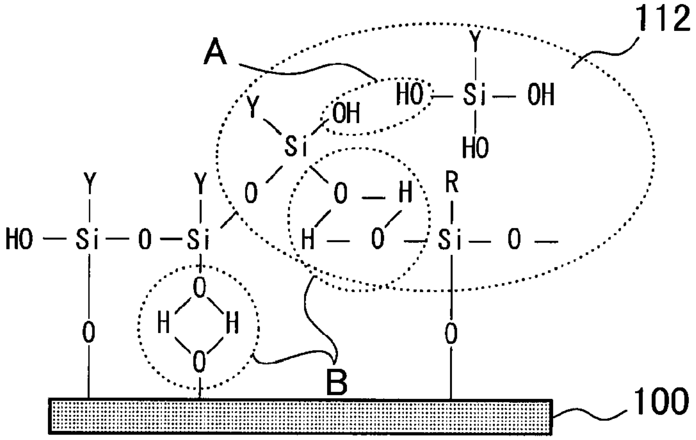
Figure 9D:
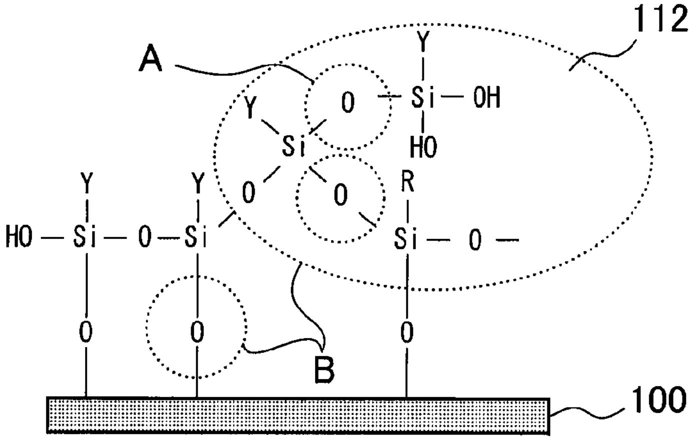

In actual practice, the organic film may be constituted of a matrix structure portion 112, in which molecules of the raw material (silane coupling agent) are bonded together and incorporated, a bonding portion 111 with the substrate, and an uppermost surface portion 113, as shown in FIGS. 9A and 9B. It is thought that, since molecules of the silane coupling agent are bonded together and also bonded to the base member through hydrogen bonds, as shown in FIG. 9B, then the film itself is not uniform and unbonded molecules of the silane coupling agent are present, leading to the formation of island-shaped projections. Therefore, in the present embodiment, the base member 100 on which the organic film 110 has been formed is held in an atmosphere containing water vapor, and it is thereby possible to substitute hydroxyl groups (OH groups) for the reactive functional groups which have not yet been hydrolyzed and have remained unaltered during the formation of the organic film (this location is denoted with A in FIG. 9B), as shown in FIG. 9C.

(3) Dehydration Processing Step

The dehydration processing step is a step of carrying out dehydration processing by holding the base member 100 undergone the water vapor introduction step in an atmosphere having a smaller presence of water vapor than in the water vapor introduction step.

The dehydration processing step can also be carried out by placing the base member 100 in a humidity-controllable thermostatic chamber, similarly to the water vapor introduction step. By making the temperature inside the thermostatic chamber 30° C. or higher, it is possible to lower the humidity, and the temperature is desirably 40° C. or higher, more desirably 70° C. or higher, and even more desirably 100° C. or higher. The relative humidity inside the thermostatic chamber is desirably 20% or lower, and more desirably 10% or lower, and even more desirably 5% or lower. For example, it is desirable that the processing is carried out for one hour or more in the atmosphere having the temperature of 100° C. or higher and the relative humidity of 5% or lower. In the present invention, there are no limits to the temperature set for the process, provided that it enables processing at low humidity, but in order to lower the humidity, it is desirable to carry out processing in the temperature range stated above. Moreover, raising the temperature also makes it possible to shorten the processing time.

Furthermore, the gas other than water vapor inside the thermostatic chamber is desirably an inert gas such as a rare gas, or $N_2$ gas. By using an inert gas, it is possible to prevent contamination, as well as restricting effects on the base member and the organic film.

The dehydration processing step can also be carried out by a vacuum process where the base member 100 is left in a vacuum environment, or by a purging process where a rare gas or nitrogen gas is introduced from a vacuum state and then expelled. Both the vacuum process and the purging process are able to reduce the humidity of the atmosphere surrounding the base member 100, and are therefore able to perform the dehydration process.

Next, the beneficial effects of the dehydration processing step are described. After the water vapor introduction step, unreacted molecules of the silane coupling agent having hydroxyl groups (the hydroxyl groups having been substituted in the water vapor introduction step) are present on the matrix structure section 112, as shown in FIG. 9C. Moreover, molecules of the silane coupling agent are bonded to the base member 100 and also bonded together through hydrogen bonds (these locations are denoted with B in FIG. 9C). In the dehydration processing step, the locations denoted with A and B in FIG. 9C become bonded through siloxane bonds due to the dehydrating condensation reaction, and it is thereby possible to form a stronger film, as well as being able to cause the unreacted molecules of the silane coupling agent to react, thus making it possible to level the organic film.

Thus, by carrying out the post-processing according to the embodiment of the method of forming the organic film in the present invention, it is possible to bond the unreacted molecules of the silane coupling agent through siloxane bonds, and therefore the surface of the organic film is leveled through the post-processing.

Moreover, since the island-shaped projections are removed by means of reaction inside the organic film, in contrast to the methods of dissolution by a fluoric solvent or mechanical removal in the related art, then it is possible to restrict decline in the film thickness, and desirably, the thickness of the organic film after the post-processing is kept to 70% or more and 100% or less compared to the thickness of the organic film before the post-processing.

In the present embodiment, as shown in FIGS. 9A to 9D, the formed organic film includes a non-crystalline layer, which is not in a crystalline state, and it is then possible to level the organic film, equalize the density of the organic film, and improve the alkali resistance of the organic film in the post-processing steps. Hence, it is especially desirable to carry out the post-processing steps in the organic film layer having a non-crystalline layer. Furthermore, as the number of reactive functional groups of the silane coupling agent (expressed as X in $Y_nSiX_{4-n}$) becomes greater, so the number of bonding sites increases, and the bonds between molecules of the silane coupling agent themselves become greater, making the island-shaped projections more liable to form. Therefore, especially beneficial effects are achieved if using a silane coupling agent having a large number of reactive functional groups.

The organic film forming method, nozzle plate, inkjet head and electronic device according to the embodiments of the present invention have been described in detail above; however, the present invention is not limited to the aforementioned embodiments, and it is of course possible for improvements or modifications of various kinds to be implemented, within a range which does not deviate from the essence of the present invention.

EXAMPLES

The present invention is described in more specific terms below with reference to practical examples; however, the present invention is not limited to these examples.

A fluorine-containing liquid-repellent film based on a silane coupling agent was formed by vapor deposition on a silicon base member and then immersed in an ink solution, and the surface thereof was observed with an optical microscope to assess the durability.

Moreover, differences in the smoothness of the organic film in relation to the differences in the processing method were checked with an atomic force microscope (AFM). Furthermore, the film thickness was measured by spectral ellipsometry and the variation in film thickness was confirmed.

The samples used were: sample (I) which had not undergone any processing after film formation (comparative example), and sample (II) which had undergone the water vapor introduction process and the dehydration process after film formation (using a portion of the sample (I)) (practical example).

Experimental Conditions

The water vapor introduction and dehydration processes were carried out under the following conditions.

<Water Vapor Introduction>

The water vapor introduction processing was carried out for one hour under conditions of the temperature of 60° C. and the relative humidity of 70%.

<Dehydration Processing>

The dehydration processing was carried out for one hour under conditions of the temperature of 100° C. and the relative humidity of 5%.

<Inks>

The inks used for immersion were inks having the compositions indicated below.

The pH of the ink was 9.0 in each of the ink compositions.

<<Composition of Ink 1>>

Cyan dispersion liquid 1: 3 wt % (by pigment concentration)
Resin particles dispersion P-2: 7 wt %
Sannix GP-250 (made by Sanyo Chemical Industries): 10 wt %
Tripropylene glycol monomethyl ether: 10 wt %
Olefin E1010 (surfactant made by Nisshin Chemicals): 1 wt %
Deionized water: Remainder <<Composition of Ink 2>>

Cyan dispersion liquid 1: 2 wt % (by pigment concentration)
Resin particles dispersion P-2: 8 wt %
Sannix GP-250 (made by Sanyo Chemical Industries): 8 wt %
Tripropylene glycol monomethyl ether: 8 wt %
Olefin E1010 (surfactant made by Nisshin Chemicals): 1 wt %
Deionized water: Remainder <<Composition of Ink 3>>

Cyan dispersion liquid 1: 4 wt % (by pigment concentration)
Resin particles dispersion P-2: 7 wt %
Sannix GP-250 (made by Sanyo Chemical Industries): 9 wt %
Tripropylene glycol monomethyl ether: 9 wt %
Olefin E1010 (surfactant made by Nisshin Chemicals): 1 wt %
Deionized water: Remainder Experimental Results <Durability>

Figure 10:
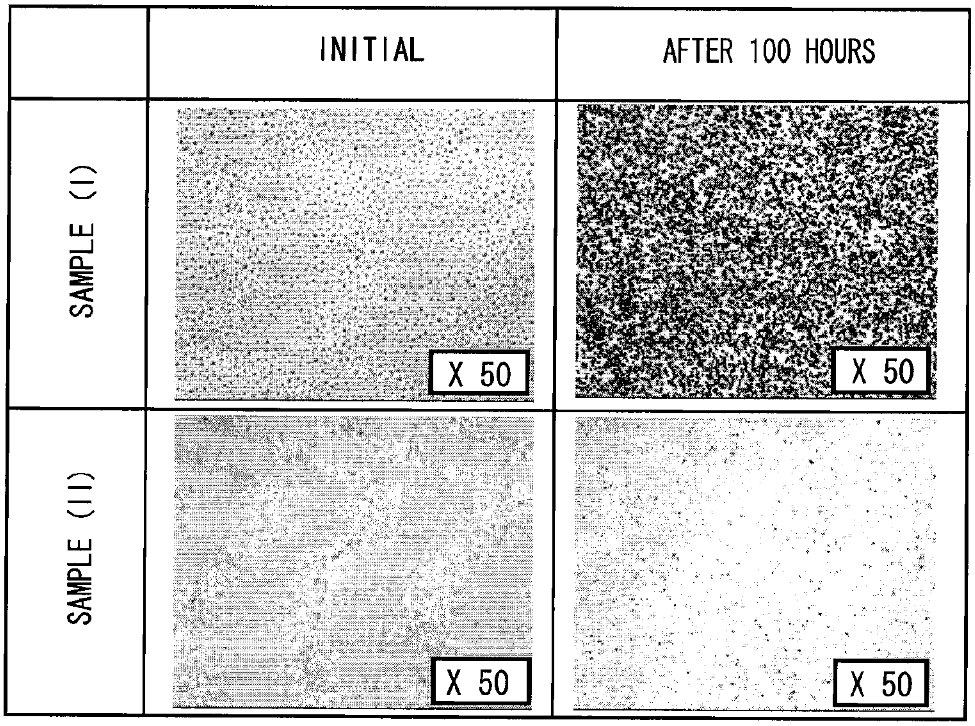
FIG. 10 shows photographs of the organic film taken by an optical microscope, before and after immersion in alkaline ink, in practical examples.

The samples which had undergone the film formation were immersed in the respective inks and taken out after 100 hours, and the surface thereof was observed with an optical microscope. FIG. 10 shows the results obtained with the ink 1.

As shown in FIG. 10, in the sample (II), virtually no etching traces were observed in the underlying silicon substrate even after immersion in the ink for 100 hours, and hence the liquid-repellent properties had not declined from the initial state. On the other hand, in the case of the sample (I), the liquid-repellent film was erased by the alkaline ink as a result of the immersion in the ink, and a large number of etching traces were observed in the underlying silicon substrate.

<Smoothness>

Under measurement by an atomic force microscope, the arithmetic mean roughness (Ra) of the sample (I) was 26.92 nm, and the arithmetic mean roughness (Ra) of the sample (II) was 7.51 nm Moreover, the mean square roughness (RMS) of the sample (I) was 31.12 nm, and the mean square roughness (RMS) of the sample (II) was 10.36 nm. Hence, it could be confirmed that the surface is smoothed by carrying out the post-processing in accordance with the method of the present invention.

<Variation in Film Thickness>

The film thickness of the sample (I) before immersion in the ink was 23 nm, whereas the film thickness of the sample (II) before immersion in the ink was 22 nm. Accordingly, the post-processing according to the method of the present invention does not produce a decrease in the film thickness, in contrast to the methods based on fluoric solvent or mechanical removal in the related art. Consequently, it can be conformed that there is no decline in the alkali resistance due to decrease in the film thickness and furthermore, smoothness can be improved.

Although the results are not shown, similar findings were observed for the inks 2 and 3 (having different content ratios than the ink 1) as well. Moreover, similar beneficial effects were also confirmed with respect to commercial water-soluble pigment-based ink. Furthermore, it is possible to improve the durability of the organic film formed by a silane coupling agent in respect of alkaline solutions, as well as pigment-based and dye-based inks.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of forming an organic film, comprising:

an organic film formation step of forming an organic film on a surface of a base member using a silane coupling agent; and a post-processing step including a water vapor introduction step of holding the base member on which the organic film has been formed in an atmosphere containing at least water vapor, and a dehydration processing step of holding the base member in an atmosphere having a smaller presence of water vapor than the atmosphere in the water vapor introduction step, wherein in the dehydration processing step, the base member undergoes a vacuum process.

2. A method of forming an organic film, comprising:

an organic film formation step of forming an organic film on a surface of a base member using a silane coupling agent; and a post-processing step including a water vapor introduction step of holding the base member on which the organic film has been formed in an atmosphere containing at least water vapor, and a dehydration processing step of holding the base member in an atmosphere having a smaller presence of water vapor than the atmosphere in the water vapor introduction step, wherein in the dehydration processing step, the base member undergoes a purging process.

3. An organic film formed by a method of forming organic film, the method comprising:

an organic film formation step of forming an organic film on a surface of a base member using a silane coupling agent; and a post-processing step including a water vapor introduction step of holding the base member on which the organic film has been formed in an atmosphere containing at least water vapor, and a dehydration processing step of holding the base member in an atmosphere having a smaller presence of water vapor than the atmosphere in the water vapor introduction step, wherein the organic film includes a non-crystalline layer.

4. The organic film as defined in claim 3, wherein arithmetic mean roughness of a surface of the organic film after the post-processing step is less than arithmetic mean roughness of the surface of the organic film before the post-processing step.

5. The organic film as defined in claim 3, wherein a thickness of the organic film after the post-processing step is not less than 70% and not more than 100% with respect to the thickness of the organic film before the post-processing step.

6. The organic film as defined in claim 3, wherein the organic film contains at least fluorine.

* * * * *

UNITED STATES PATENT AND TRADEMARK OFFICE

CERTIFICATE OF CORRECTION

PATENT NO. : 8,475,885 B2
APPLICATION NO. : 12/893948
DATED : July 2, 2013
INVENTOR(S) : Hiroki Uchiyama It is certified that error appears in the above-identified patent and that said Letters Patent is hereby corrected as shown below:

In the Claims:

Column 20, Line 66, in Claim 3: after "forming" insert -- an --.

Signed and Sealed this
Tenth Day of September, 2013

Teresa Stanek Rea
*Acting Director of the United States Patent and Trademark Office*